Sept. 24, 1940.   B. DICK   2,215,547
BRAKING MECHANISM
Filed July 31, 1939
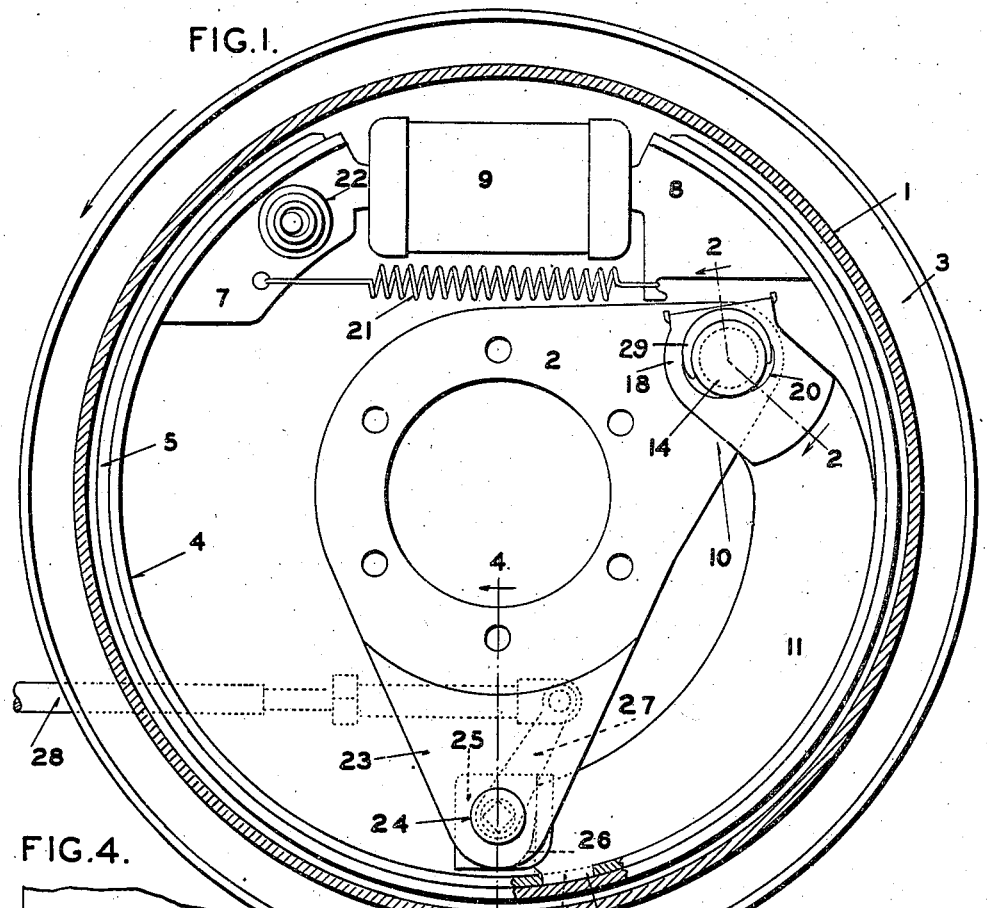
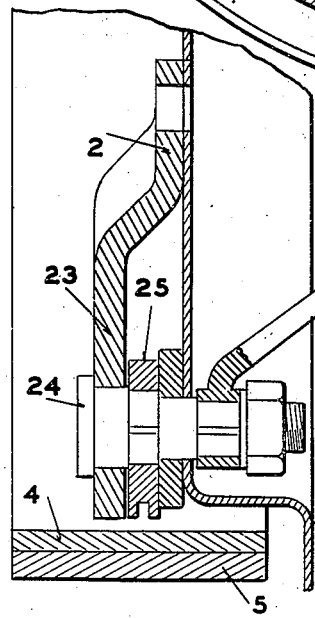
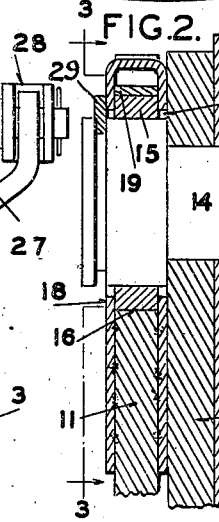
INVENTOR
BURNS DICK
BY
ATTORNEY Patented Sept. 24, 1940

2,215,547

UNITED STATES PATENT OFFICE 2,215,547

BRAKING MECHANISM

Burns Dick, Ferguson, Mo., assignor to Wagner Electric Corporation, St. Louis, Mo., a corporation of Delaware Application July 31, 1939, Serial No. 287,571

6 Claims. (Cl. 188—79.5)

My invention relates to braking mechanism and has for one of its objects to provide an improved brake of the type having a lining carrying band extending over substantially 360 degrees of the drum.

A more specific object of my invention is to provide, in a band brake having associated therewith a pressure applying lever connected to the band and pivotally mounted on the support, means for so automatically adjusting the mounted end of the lever that wear of the lining will be compensated for and the distribution of pressure on the band by the lever will not be altered during the life of the lining.

Other objects of my invention will become apparent from the following description taken in connection with the accompanying drawing in which Figure 1 is a side view, partly in section, of a brake assembly embodying my invention; Figure 2 is a cross-sectional view taken on the line 2—2 of Figure 1 showing the mounting of the pressure applying lever; Figure 3 is a view taken on the line 3—3 of Figure 2; and Figure 4 is a cross-sectional view taken on the line 4—4 of Figure 1.

Referring to the drawing in detail, the numeral 1 indicates a brake drum which is fixed to the rotative element (not shown) to be braked, and 2 the support for mounting the brake within the drum, said support being secured to a fixed member. The drum is enclosed by a dust excluding plate 3 secured to the support 2. Within the drum is a substantially 360 degree brake band 4 provided with a continuous friction lining 5. The ends of the band are provided with reinforcing members 7 and 8 which cooperate with the oppositely movable pistons (not shown) of an actuating fluid motor 9 of well-known construction.

The support 2 is formed with an arm 10 and mounted thereon at one of its ends is an arcuate-shaped lever 11 extending over and contacting a substantial arc of the band, the other end of said lever being secured to the band by having a portion 12 thereof extending into a slot 13 in the band. The means for mounting the end of the lever 11 on the support arm 10 comprises an anchor pin 14 carried by said arm and upon which is pivotally mounted a block 15. The end of the lever is notched to form an abutment surface 16 and a surface 17 at right angles thereto. A U-shaped member 18 is mounted on the end of the lever and forms, with the notched end of the lever, a pocket for receiving the block 15.

This construction permits the end of the lever to have relative movement outwardly toward the drum with respect to the block. The pocket in which the block is positioned is slightly oversize with respect to the block to permit the insertion of a leaf spring 19 between the block and the closed end of the U-shaped member for causing the abutment surface 16 on the end of the shoe to be held in tight frictional engagement with the cooperating surface of the block. The U-shaped member is provided with oversize openings 20 to permit free relative movement of the end of the shoe with respect to the pin. The end of the shoe is held on the anchor pin by a C washer 29 engaging a groove in the inner end of the pin.

The anchor pin 14 constitutes the sole anchor for the brake band when the drum is rotating in the direction indicated by the arrow which is the normal "forward" direction. Under these conditions, when the ends of the brake band are expanded into engagement with the drum by means of the fluid motor, the drag of the drum will cause the band to swing the lever outwardly toward the drum and whereby the lever will apply a radial pressure to the band over that portion of the band with which it contacts. It is thus seen that the self energizing action of the band produces an additional pressure on the rear portion of the band by means of the lever which will increase the total braking torque of the band over that of a band in which the band is anchored at its intermediate point or at one end.

The force acting on the lever during brake application will also cause the mounted end of the lever to be forced outwardly toward the drum since the plane of contact between the abutment surface 16 and the block is at such an angle that there will be a force acting toward the drum. This force is sufficient to overcome the frictional resistance created by the spring 19 between surface 16 and the block. It is to be noted, however, that the spring does not in any way restrain free pivotal movement of the lever. Thus the lever can have its free swinging movement as the band is applied and released from the drum and the friction created by the spring will not be affected. As the brake lining 5 of the band wears, the mounted end of the lever will be automatically adjusted toward the drum and this new adjusted position will always be maintained by the spring 19 which is of such strength as to create sufficient friction between the abutment surface 16 and the block that the disengagement of the band from the drum will not move the mounted end of the lever from its new adjusted position. The brake band, when released, will cause the lever to pivot in a clockwise direction about its mounted end and this pivotal movement will be such as to permit the freeing of the band from the drum. It is to be noted in this respect that a substantial portion of the lever adjacent its mounted end is not in contact with the band.

There is also provided a spring 21 connected between the reinforcing members 7 and 8 on the ends of the band for retracting the ends of the band when the fluid motor is released. A suitable automatically adjustable stop means 22 cooperates with the reinforcing member 7 to limit the distance this end of the band can be retracted from the drum.

In order that there may be an anchor for the band when the drum is rotating in the direction opposite that indicated by the arrow, the support 2 is formed with a downwardly extending arm 23 and mounted on this arm is a pin 24 to which is secured a block 25 for cooperation with the adjacent end of the lever 11. Thus, when the band is applied with the drum rotating in the direction opposite that indicated by the arrow, the lever will engage the block 25 and anchor the band at its intermediate portion. Under these circumstances the band will act as an ordinary band which is anchored only at its center.

In order that the band may be actuated by an auxiliary means, I have also employed the block 25 as part of an auxiliary actuating mechanism. The block is formed with a cam surface 26 and the pin upon which it is mounted is capable of being rotated by means of a lever 27 and a rod 28 which leads to some remote actuating member. When the rod 28 is moved to the left, as seen in Figure 1, the cam surface on the block will apply a pressure to the end of lever 11 and force the band into engagement with the drum.

The band brake construction just described has been found to be efficient in operation and easily controllable. The association of the lever 11 with the band in the manner shown, results in the band having a greater torque output in the forward direction of rotation. Also, this lever permits the band to be easily controllable since the amount of radial pressure created by the lever will depend upon the force with which the forward section of the band is applied to the drum by the fluid motor. There will always be a direct relationship between the input force of the band and the torque output of the brake. Also, the band, when it has associated therewith lever 11, does not tend to become "stuck" to the drum when the fluid motor is released.

The special mounting for the end of the lever permits this end of the lever to be automatically adjusted toward the drum as the lining wears. Thus the relationship between the lever and the band will always be maintained the same and the distribution of pressure on the band by the lever will be unaltered as the lining wears. If the mounted end of the lever were not automatically adusted in the manner shown, the arc of contact between the lever and the band would decrease as the lining became worn and the effectiveness of the lever would be decreased. By having the mounted end of the lever adjustable, this arc of contact will always be maintained the same throughout the life of the lining. Also, by having the mounted end of the lever automatically adjustable, it is unnecessary to make any adjustment for wear of the lining throughout the entire life of the lining. The retractile spring 21 will not in any way affect the adjustment of the mounted end of the lever since the friction between the abutment surface and the block is great enough to maintain the adjustment against the pull of this retractile spring.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, the combination of a support, a brake drum, a friction device adapted to have its ends expanded to engage it with the drum, a lever mounted at one end on the support adjacent the friction device for both pivotal movement and adjustment toward the drum and connected at its other end to an intermediate portion of the friction device, an intermediate portion of said lever contacting the friction device and applying a radial pressure to a substantial arc thereof when said friction device is engaged with the drum, said mounting for the end of the lever comprising parts having abutting surfaces capable of relative sliding movement in a selected plane for permitting said end of the lever to be automatically adjusted toward the drum by force effective on the lever during braking application and when the friction device adjacent the mounted end of the lever is reduced by wear, and means for preventing said mounted end of the lever from returning to a position occupied prior to such adjustment.

2. In braking apparatus, the combination of a support, a brake drum, a friction device adapted to have its ends expanded to engage it with the drum, a lever mounted at one end on the support adjacent the friction device for both pivotal movement and adjustment toward the drum and connected at its other end to an intermediate portion of the friction device, the intermediate portion of said lever contacting the friction device and applying a radial pressure to a substantial arc thereof when said friction device is engaged with the drum, said mounting for the end of the lever comprising abutment means carried by the support for preventing circumferential movement of the lever and other means permitting the end of the lever to move toward the drum automatically by force effective on the lever during braking application when the brake lining thickness of the friction device adjacent the mounting is reduced by wear, and friction means for maintaining the end of the lever in adjusted position, said friction means not restraining free pivotal movement of the lever during applying and releasing of the friction device from the drum.

3. In braking apparatus, the combination of a support, a brake drum, a substantially 360 degree brake band provided with lining and adapted to have its ends expanded to engage it with the drum, an arcuate lever mounted at one end on the support adjacent one end of the band for both pivotal movement and adjustment toward the drum and connected at its other end to an intermediate portion of the band, said lever contacting the band and applying a radial pressure to a substantial arc thereof when said band is engaged with the drum and said mounting for the end of the lever comprising parts having abutting surfaces capable of relative sliding movement in a selected plane for permitting said end of the lever to be automatically adjusted toward the drum by force effective on the lever during braking application and when the lining adjacent said mounted end of the lever is reduced by wear, and friction means preventing the end of the lever from returning to a position occupied prior to an adjustment.

4. In braking apparatus, the combination of a support, a brake drum, a substantially 360 degree brake band provided with lining and adapted to have its ends expanded to engage it with the drum, an arcuate lever mounted at one end on the support adjacent one end of the band for both pivotal movement and adjustment toward the drum and connected at its other end to an intermediate portion of the band, said lever contacting the band and applying a radial pressure to a substantial arc thereof when said band is engaged with the drum, said mounting for the end of the lever comprising parts having relative rotative movement for permitting pivotal movement of the lever and also parts having abutting surfaces capable of relative sliding movement in a selected plane for permitting said end of the lever to be automatically adjusted toward the drum by force effective on the lever during braking application and when the lining adjacent said mounted end of the lever is reduced by wear, and spring means for maintaining said abutment surfaces in frictional engagement and preventing the end of the lever from returning to a position occupied prior to an adjustment, said spring means not restraining free relative movement of the parts which permit pivotal movement of the lever.

5. In braking apparatus, the combination of a support, a brake drum, a friction device adapted to have its ends expanded to engage it with the drum, a lever mounted at one end on the support adjacent the friction device for both pivotal movement and adjustment toward the drum and connected at its other end to an intermediate portion of the friction device, an intermediate portion of said lever contacting the friction device and applying a radial pressure to a substantial arc thereof when said friction device is engaged with the drum, said mounting for the end of the lever comprising an anchor pin carried by the support, a member provided with a plane surface and mounted on the pin for pivotal movement only, means forming a plane abutment surface on the lever for engaging the plane surface on the member and permitting the end of the lever to move toward the drum and relatively to the member by force effective on the lever during braking application when the friction device adjacent the mounted end of the lever is reduced by wear, and means independent of the anchor pin and cooperating with the lever and the member for frictionally maintaining the end of the lever in adjusted position with respect to the member.

6. In braking apparatus, the combination of a support, a brake drum, a substantially 360 degree band provided with lining and adapted to have its ends expanded to engage it with the drum, an arcuate lever mounted at one end on the support adjacent one end of the band for both pivotal movement and adjustment toward the drum and connected at its other end to an intermediate portion of the band, said lever contacting the band and applying a radial pressure to a substantial arc thereof when said band is engaged with the drum, said mounting for the end of the lever comprising an anchor pin carried by the support, a block mounted on the pin for pivotal movement only, means forming a slot in the end of the lever for receiving the block and permitting a flat surface of the slot to engage a flat surface of the block whereby the end of the lever will move toward the drum and relatively to the block by force effective on the lever during braking application when the lining adjacent the mounted end of the lever is reduced by wear, and a spring carried by the lever for forcing the flat abutment surface of the lever into frictional engagement with the flat surface of the block and maintaining the end of the lever in adjusted position with respect to the block.

BURNS DICK.